United States Patent [19]
Anderson

[11] Patent Number: 5,680,258
[45] Date of Patent: Oct. 21, 1997

[54] OPTICAL GUIDE FOR INCREASING PRINTER IMAGE WIDTH

[75] Inventor: Charles H. Anderson, Dallas, Tex.

[73] Assignee: Texas Instruments Incorporated, Dallas, Tex.

[21] Appl. No.: 678,448

[22] Filed: Jul. 3, 1996

Related U.S. Application Data

[62] Division of Ser. No. 346,711, Nov. 30, 1994, Pat. No. 5,581,413.

[51] Int. Cl.⁶ .................................................... G02B 17/00
[52] U.S. Cl. ........................... 359/730; 359/224; 359/731; 348/756
[58] Field of Search ............................ 359/223, 726–732, 359/850, 857–859, 207, 208, 224; 348/750, 755–759, 764, 770–771

[56] References Cited

U.S. PATENT DOCUMENTS 5,105,299  4/1992  Anderson et al. ...................... 359/223

*Primary Examiner*—James Phan
*Attorney, Agent, or Firm*—Julie L. Reed; James C. Kesterson; Richard L. Donaldson

[57] ABSTRACT

An optical guide for horizontally aligning two vertically stacked images generated by one or two SLMs. The optical guide has a beam splitter that directs both images along two different paths. A first and a second aligning reflectors each disposed along each path for aligning the images. The beam splitter then redirects the images to the image plane 15. Along both paths, at least the aligning reflectors are optically powered so as to change the width or height of the images.

1 Claim, 4 Drawing Sheets

OPTICAL GUIDE FOR INCREASING PRINTER IMAGE WIDTH

This is a divisional, of application Ser. No. 08/346,711, filed Nov. 30, 1994, now U.S. Pat. No. 5,581,413.

TECHNICAL FIELD OF THE INVENTION

This invention relates to optical devices, and more particularly to an optical guide that aligns two stacked images generated by a spatial light modulator in a printer exposure unit.

BACKGROUND OF THE INVENTION

Spatial light modulators (SLMs) are commonly used for imaging applications, both for display and printing. In general, an SLM is an array of pixel elements, which are individually addressable, usually with electronic signals. Many SLMs are binary, having an addressing scheme that switches the pixels to either an "on" or an "off" state to form the image. Various modulation and integration schemes are used to provide greyscale images. For printing applications, the SLM is used to expose a photoreceptor drum and can be addressed so that its pixels selectively emit or reflect light to the drum in accordance with the desired image.

One type of SLM is a digital mirror device (DMD), sometimes referred to as a deformable mirror device. The DMD has an array of hundreds or thousands of tiny tilting mirrors, which are the pixels. To permit the mirrors to tilt, each is attached to one or more hinges mounted on support posts, and spaced by means of an air gap over underlying control circuitry. The control circuitry provides electrostatic forces, which cause each mirror to selectively tilt.

For printing applications, SLMs are typically used to generate long and narrow images, which expose a given number of rows on the photoreceptor drum. For example, a typical SLM might be an inch long with rows of 900 pixels across its length. With appropriate magnification, an SLM of this size is suitable for exposing a 3 inch long strip of the image at 300 dots per inch (dpi).

However, it is often desired to have an image that is longer across than 3 inches. Although this could be accomplished by either adding more pixels so that the SLM is longer or by increasing the magnification, neither of these alternatives is desirable. A better technique for increasing the image size is described in U.S. Pat. No. 5,105,299, entitled "Unfolded Optics for Multiple Row Deformable Mirror Device", assigned to Texas Instruments Incorporated. The patent describes using a DMD to simultaneously generate two images, one above the other. One image is the left half of the line to be printed, and one image is the right half of the line. An optical guide is used to project both images side-by-side in their correct alignment.

SUMMARY OF THE INVENTION

One aspect of the invention is an anamorphic optical guide for aligning two stacked images generated by at least one spatial light modulator (SLM). In the example of this description, a single SLM generates two stacked images. A projection lens directs both images along an axis of projection between the SLM and an image plane. Then, an entry pair of reflective surfaces directs both images along a right path and both images along a left path, each path beginning with one of the entry pair of reflective surfaces. Next, a first pair of reflective surfaces disposed along the left path directs the images on the left path toward the axis, while a second pair of reflective surfaces disposed along the right path directs the images on the right path toward the axis. Finally, an exit pair of reflective surfaces, one along each optical path, directs the images to the image plane. At least two of the reflective surfaces along each optical path are optically powered for adjusting the width or height of the images.

An advantage of the invention is that it provides a means for printing or displaying wider images with currently available narrow SLM arrays. Because of the anamorphic capability of the optical guide, these images can be made to have higher resolution without changing the size of the pixel elements of the SLM or the size of the array. Furthermore, for printing applications, the anamorphic capability permits the use of spatial variations for exposing each pixel so that greyscale levels can be achieved.

DETAILED DESCRIPTION OF THE INVENTION

Figure 1:
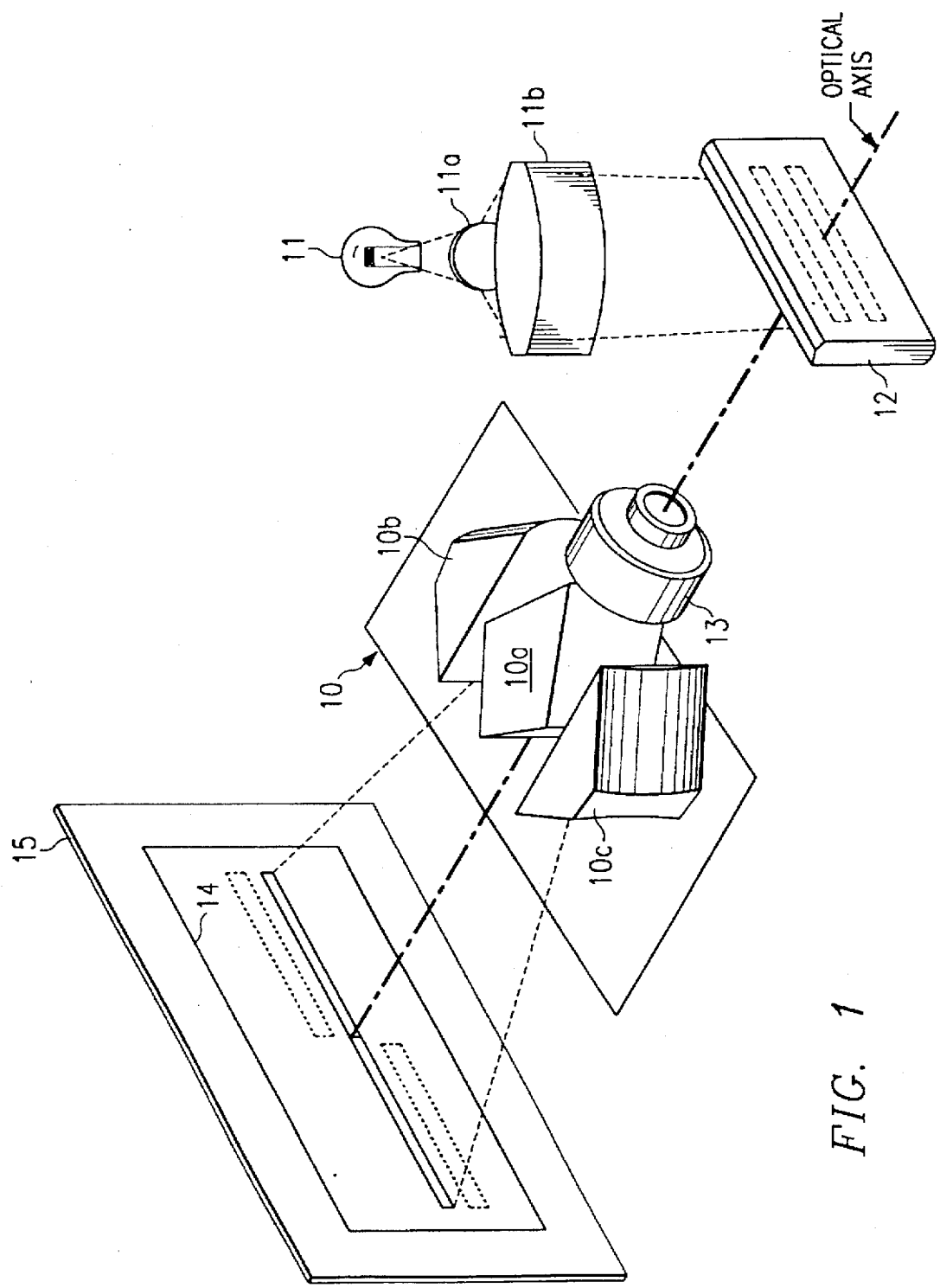
FIG. 1 is a perspective view of an exposure system for a printer drum, with an anamorphic optical guide in accordance with the invention.

FIG. 1 illustrates an anamorphic optical guide 10 in accordance with the invention. As explained below, optical guide 10 receives two "stacked" images. Optical guide 10 directs these images to an image plane 14, such that the two images are aligned side-by-side. It also adjusts the height or width of the images, such that the final image is anamorphic in accordance with a desired ratio of height to width.

The following description is directed primarily to the anamorphic capability of optical guide 10. An optical guide without the anamorphic image capability of the present invention is described in U.S. Pat. No. 5,105,299, entitled "Unfolded Optics for Multiple Row Deformable Mirror Device", assigned to Texas Instruments Incorporated and incorporated by reference herein.

In the example of this description, the source images are generated by an SLM 12 such as a DMD. As explained in the background, a DMD operates by reflecting light from tiny mirrors, which are selectively addressed. A typical DMD might have 1000 mirror elements per row, with each mirror element being individually addressable.

A light source 11 illuminates SLM 12 via lenses 11a and 11b, and the image is reflected from SLM 12. However, if some other type of SLM is used, such as one whose pixels emit rather than reflect light, a light source 11 may not be necessary.

As indicated by the dotted lines in FIG. 1, SLM 12 generates a top image and a bottom image. These images are "stacked", one above the other. For this purpose, SLM 12 has at least two rows of mirror elements. For simplicity of description, it is assumed that SLM 12 generates the two stacked images with one row of pixels per image. However, it is possible that SLM 12 might use more than one row of pixels to generate each image. Also, SLM 12 might generate more than two images at a time.

In the example of this description, a single SLM 12 generates both the top image and the bottom image. However, in other embodiments, instead of a single SLM 12 generating both images, two SLMs could be closely spaced, with one generating the top image and the other generating the bottom image.

As generated by SLM 12, the image is above and one image is below an imaginary optical axis, which extends from the aperture of optical guide 10 to the image plane 14. Projection lens 13 receives the images generated by SLM 12 and projects them along the optical axis to optical guide 10.

Figure 2:
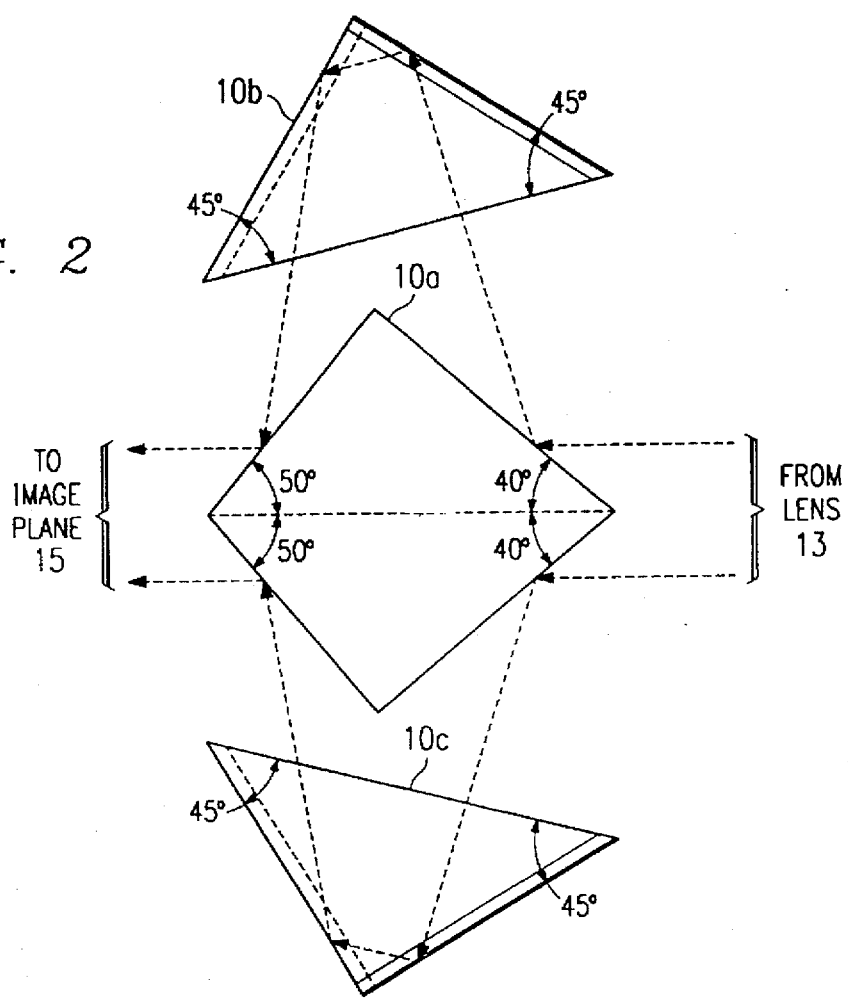
FIG. 2 is a top plan view of the optical guide of FIG. 1.

FIG. 2 is a top plan view of optical guide 10. As indicated in both FIGS. 1 and 2, optical guide 10 is comprised of a total of eight reflecting surfaces along two optical paths, a left path and a right path. Each optical path has four reflecting surfaces. In the embodiment of this description, a channel separator 10a provides two reflecting surfaces for each path, referred to herein as each path's "entry" surface and "exit" surface. Two aligning prisms 10b and 10c provide the other two reflecting surfaces for each path.

The angles illustrated in FIG. 2 are for purposes of example. Variations of these angles can be geometrically derived, based on known optical principles, such that the left optical path and the right optical path will eventually be positioned in the same plane as, and at least substantially parallel to, the optical axis.

Channel separator 10a may be comprised of four mirrors, or, alternatively, of a prism with four silvered surfaces. Channel separator 10a receives the images from SLM 12 via lens 13, which provides a left image and a right image. Alternatively, two lens instead of a single lens 13, both viewing SLM 12, could provide the two images. Channel separator 10a directs both images along a left path and both along a right path. Thus, each optical path carries both the top image and the bottom image generated by SLM 12.

In the example of this description, aligning reflectors 10b and 10c are right angle isosceles prisms. In FIG. 1, each has its right angle milled off for packaging convenience. However, like channel separator 10a, aligning prisms 10b and 10c could each be two reflecting surfaces regardless of how attached to each other.

Figure 3:
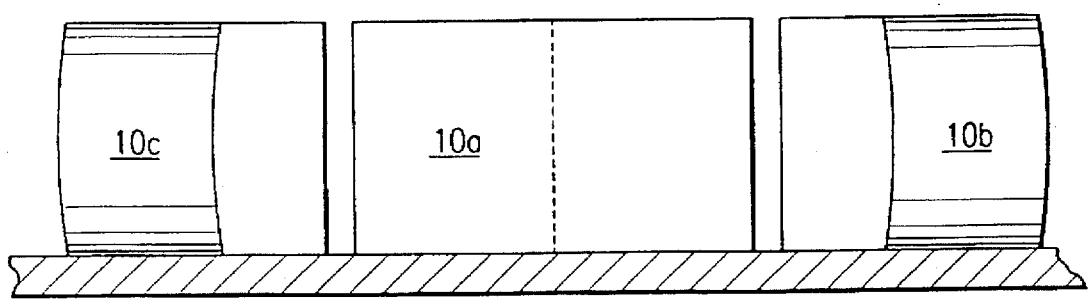
FIG. 3 is a front view of the optical guide of FIG. 1.

FIG. 3 is a front view of optical guide 10. As illustrated, aligning reflectors 10b and 10c are tilted with respect to the vertical. Because of their tilt, each aligning reflector 10b and 10c raises or lowers the image along one path with respect to the image along the other path, such that part of the left path's images are in the same horizontal plane as part of the right path's images.

In the example of this description, reflector 10b is tilted inward toward channel separator 10a and reflector 10c is tilted outward from channel separator 10a. The tilt angles are chosen so that the top image from one optical path is aligned with the bottom image from the other optical path. However, it should be understood that if one image is directed along a path in the same horizontal plane as the optical axis, the alignment could be accomplished by raising or lowering only the other path's images. Also, the tilting could be reversed—either the top or bottom image on one path could be aligned with the other image on the other path.

The exit surfaces of channel separator 10a re-direct the images toward the image plane 15. An aperture 14 in front of image plane 15 transmits the two aligned images and blocks portions of the images that are not aligned. In the example of this description, the top image on one path is blocked, as is the bottom image on the other path.

The final image is a long continuous image, comprised of the top image and the bottom image originally generated by SLM 12. This image illuminates the image plane 15, which for printing applications, is a photoreceptor drum.

As stated above, the components of optical guide 10 are designed so as to adjust the size of the final images at image plane 14. In effect, each pixel becomes anamorphic. As explained below, the height or the width of the image can be adjusted by making two or more surfaces along each optical path optically powered.

In the embodiment of FIGS. 1–3, the two reflecting surfaces of each aligning reflector 10b and 10c are optically powered so as to decrease the vertical size of the image. For example, the vertical size might be adjusted so that it is ½ the horizontal size. At the pixel level, each pixel has become ½ as high as it is wide. This permits a two-fold increase in vertical resolution. In other words, where an image with non-anamorphic pixels might have a resolution of 600 dpi in both the process (vertical) direction and the cross-process (horizontal) direction, these anamorphic pixels would provide an increase of resolution in the process direction to 1200 dpi.

For printing applications, the anamorphic capability of optical guide 10 can also be used to provide greyscale images. For example, two rows of pixel elements of SLM 12 could be used to generate each row of the image on the image plane. Thus, two pixel elements of SLM 12 are used to generate one pixel of the image. For each pixel, a greyscale level of intensity can be accomplished according to whether neither, only one, or both pixel elements of SLM 12 are "on" for the corresponding pixel on the image plane.

In FIGS. 1–3, the first reflecting surface of each aligning reflector 10b and 10c is concave with respect to the images incident on it. The second reflecting surface of each aligning reflector 10b and 10c is convex with respect to the images. These two reflecting surfaces are "complementary" in the sense that the first surface converges the image and the second surface focuses the image at the image plane. In this case, the image is reduced in the vertical direction. Alternatively, the two reflecting surfaces could be complementary with their roles reversed, such that the first surface is convex with respect to the image and the second surface is concave. In this case, the final images would be larger in the vertical direction. For purposes of this description, "complementary" means that the reflecting surface first met by the images is optically powered so as to adjust the size of the images, and the second surface is optically powered so as to focus the images at the image plane. Also, three reflecting surfaces could be complementary, with two surfaces instead of one being used for adjusting size or collimating. Additional optical manipulation could be performed to correct astigmatism or other aberrations.

Although in FIGS. 1–3, it is the two surfaces of the aligning reflectors 10b and 10c that are optically powered, the same result could be accomplished with any two of the four reflecting surfaces along each path. For example, the four reflecting surfaces of channel separator 10a could be optically powered. In general, the invention is operative to provide anamorphic images when at least two surfaces along each optical path have complementary optical power.

Figure 4:
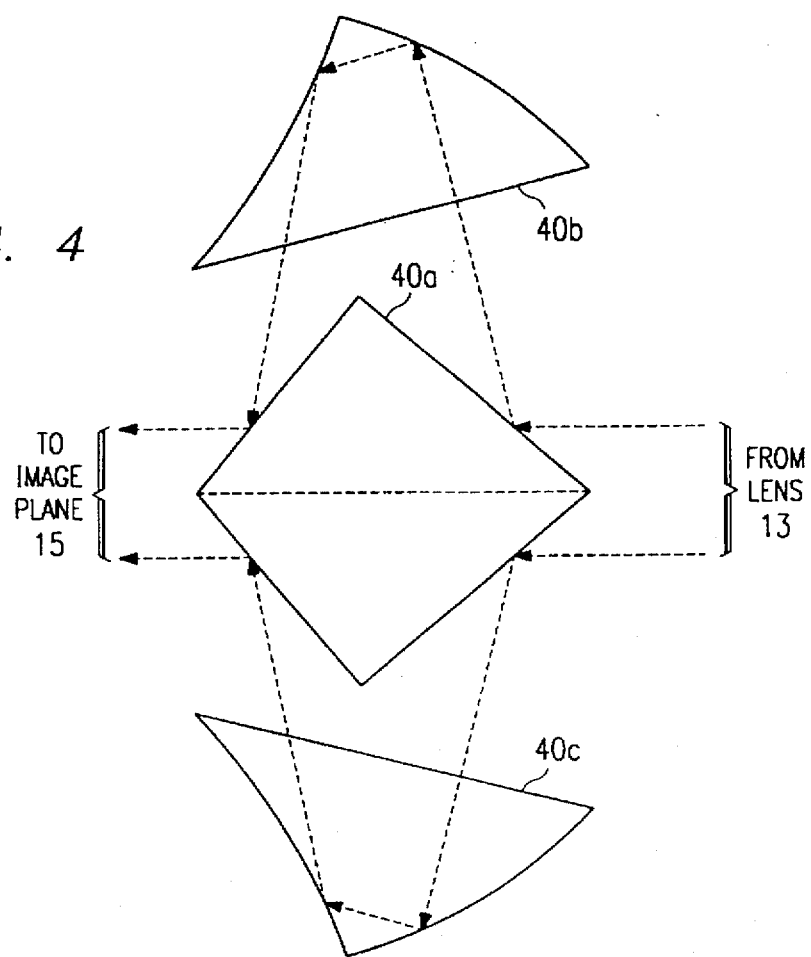
FIG. 4 is a top plan view of an alternative embodiment of the optical guide of FIG. 1.

FIG. 4 is a top view of an alternative embodiment of optical guide 10, which adjusts the size of the image in the horizontal direction. As with the optical guide 10 of FIGS. 1–3, optical guide 40 has at least two reflective surfaces that are optically powered and that are complementary. However, in FIG. 4, the optical power is in the horizontal instead of the vertical direction.

Like optical guide 10, optical guide 40 has a channel separator 40a and two aligning reflectors 40b and 40c. These components serve the same function of separating the images onto two paths and of vertically shifting the images so that at least part of each pair of images is aligned at the image plane.

In FIG. 4, the optically powered surfaces are those of the aligning reflectors 40b and 40c. On each path, the first optically powered surface is concave with respect to the images incident on it. The images are converged to the second optically powered surface, which is convex with respect to the images and focusses the images to the image plane. The final images are reduced in the horizontal direction, making them less wide than tall. Pixels with these dimensions can be used to increase horizontal resolution.

Figure 5:
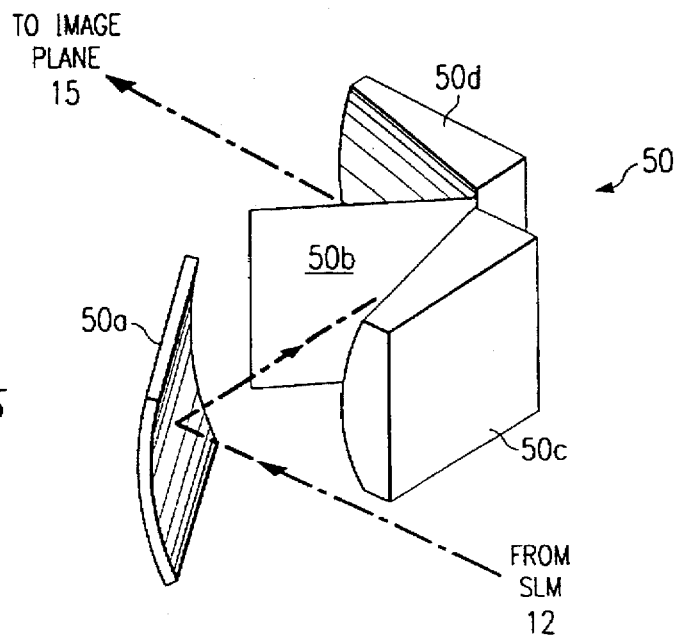
FIG. 5 is a perspective view of an alternative embodiment for an optical guide.

FIG. 5 illustrates an alternative embodiment of the invention, in which optical guide 50 comprises a plane mirror 50a, a beam splitter 50b, and two aligning reflectors 50c and 50d. The two stacked images from SLM 12 are directed by plane mirror 50a to beam splitter 50b. Beam splitter 50b is partially reflective and partially transparent so that both images are incident on each reflector 50c and 50d. Thus, both images follow a first path that has a first aligning reflector 50c, and both images follow a second path that has a second aligning reflector 50d. The reflectors 50c and 50d are tilted with respect to the vertical so as to align the images. The images are then reflected or transmitted by beam splitter 50b to the image plane 15 via projection lens 13.

Optical guide 50 has at least two reflecting surfaces along each path that are optically powered. In the example of FIG. 5, plane mirror 50a and the aligning reflectors 50c and 50d are curved in the vertical direction. Plane mirror 50a is concave with respect to the images. Aligning reflectors 50c and 50d are convex with respect to the images on their respective paths. The result is an image that is reduced in size in the vertical direction. Like optical guide 40, the optical power could alternatively be in the horizontal direction.

Figure 6:
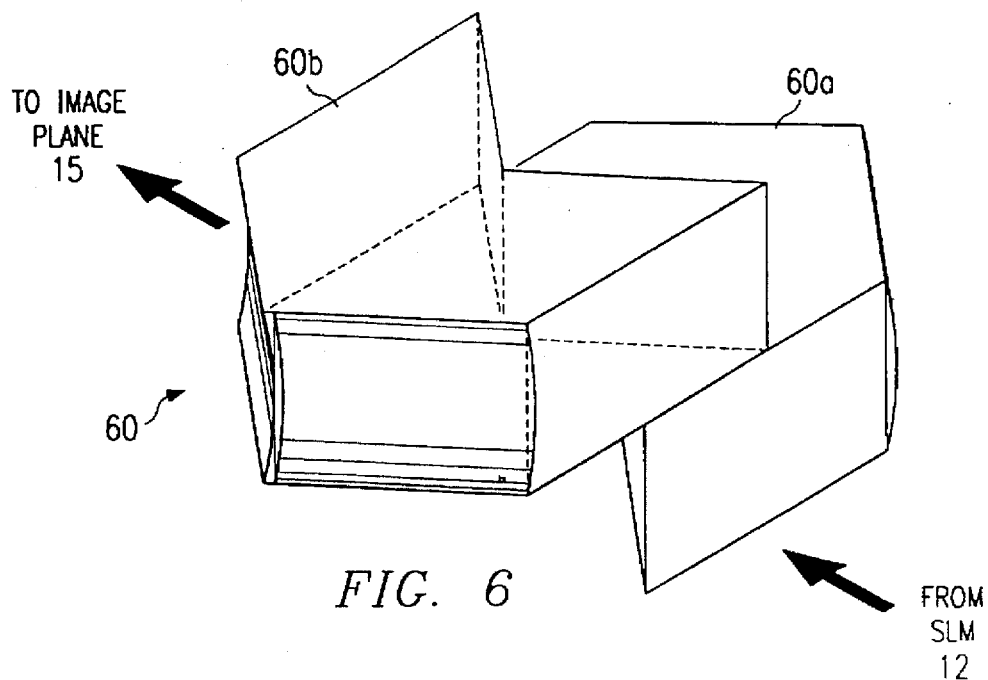
FIGS. 6–8 are perspective, top, and front views of an alternative embodiment for an optical guide.
Figure 7:
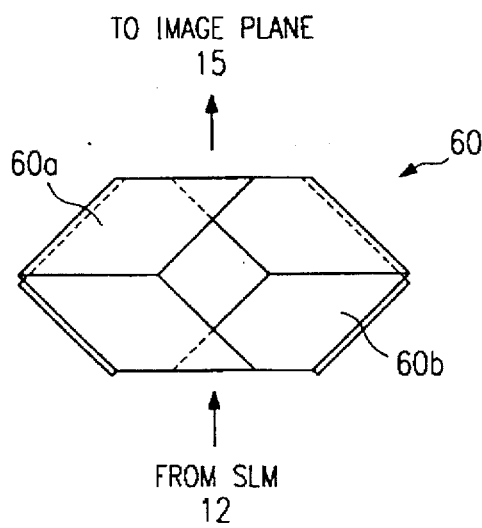
Figure 8:
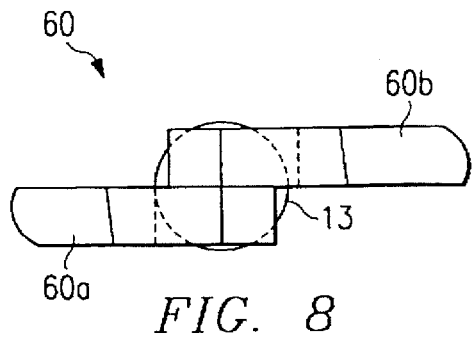

FIGS. 6–8 illustrate another embodiment of the invention, in which optical guide 60 comprises two rhomboidal prisms 60a and 60b. Rhomboidal prisms 60a and 60b separate the reflected images onto two paths, vertically align the images, and direct them to image plane 15. FIG. 6 is a perspective view and FIG. 7 is a top view showing the optical paths.

Optical guide 60 has two reflecting surfaces along each path that are optically powered. Along each path, a first reflective surface is concave with respect to the image and a second surface is convex. In the example of FIGS. 6–8, the optically powered surfaces are the third and fourth reflective surfaces along each path, which are also the tilted aligning surfaces. The concave and convex curvatures are vertical so as to modifiy the size of the image in the vertical direction. Like the other optical guides discussed herein, the two optically powered surfaces are complementary so as to focus the images to the image plane 15. Also, the curvatures could alternatively be horizontal so as to modify the horizontal size of the image.

As shown in FIG. 8, which is a front view of optical guide 60, prisms 60a and 60b have reflecting surfaces that are tilted with respect to the vertical to provide the alignment. In the example of FIG. 8, these tilted surfaces are also the optically powered surfaces. FIG. 8 also illustrates a superimposed view of lens 13, which has a top portion for providing a top image and a bottom portion for providing a bottom image. Like the other embodiments described herein, the two images could alternatively be provided with two different lenses viewing the SLM 12.

With respect to all of the above embodiments, it should be understood that the same concepts would apply if the invention were "turned on its side". Thus, two images could be generated that are parallel to each other in the vertical instead of horizontal direction. In this case, the optical guide could be re-positioned so as to align the images vertically so that one is above the other. For purposes of this description, this modification of the invention is an equivalent with the words "vertical" and "horizontal" being interchangeable.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical system for combining and projecting two spatial light modulator (SLM)-generated images onto an image plane, comprising:

a first SLM row for generating a first image;

a second SLM row for generating a second image;

wherein said first image and said second image are generally in different horizontal planes;

a projection lens for receiving said first and second images generated from said first and second SLM rows and for directing said first and second images along an axis of projection between said first and second SLM rows and said image plane;

an optical guide for guiding said first and said second image to said image plane, such that said images are horizontally aligned side-by-side on said image plane and such that said images are anamorphic and wherein said optical guide has an entry reflective surface for receiving said images from said SLM rows, a beam splitter for reflecting said images to a first path and for transmitting said images along a second path, a first aligning reflective surface disposed along said first path for directing said images on said first path toward said axis, a second aligning reflective surface disposed along said second path for directing the other of said images toward said axis, wherein said entry reflective surface and said first and said second aligning reflective surfaces are optically powered reflective surfaces for adjusting the width or height of said images.

* * * * *